United States Patent [19]

Feldmann et al.

[11] Patent Number: 4,635,982
[45] Date of Patent: Jan. 13, 1987

[54] COLLISION PROTECTION DEVICE FOR INDUSTRIAL VEHICLES, ESPECIALLY INDUSTRIAL TRUCKS

[75] Inventors: Hansueli Feldmann; Max Brändli, both of Safnern, Switzerland

[73] Assignee: Invention AG, Hergiswil, Switzerland

[21] Appl. No.: 832,255

[22] Filed: Feb. 24, 1986

[30] Foreign Application Priority Data

Mar. 1, 1985 [CH] Switzerland .................... 933/85

[51] Int. Cl.$^4$ ................... B60R 19/02; B60T 7/22
[52] U.S. Cl. .......................................... 293/2; 293/4; 293/124; 901/1; 901/49; 180/275; 180/279
[58] Field of Search ............. 293/2, 4, 5, 8, 102, 293/103, 117, 124; 901/1, 49; 180/274, 275, 277, 279; 104/172 BT

[56] References Cited

FOREIGN PATENT DOCUMENTS

| | | | |
|---|---|---|---|
| 1781159 | 4/1971 | Fed. Rep. of Germany | |
| 1655813 | 4/1971 | Fed. Rep. of Germany | |
| 2440681 | 3/1976 | Fed. Rep. of Germany | 104/172 BT |
| 3330668 | 3/1985 | Fed. Rep. of Germany | 293/4 |
| 1574435 | 7/1969 | France | |
| 2114480 | 6/1972 | France | |
| 2244647 | 4/1975 | France | |
| 2523908 | 9/1983 | France | 293/2 |

OTHER PUBLICATIONS

Automatik, Apr. 1959, pp. 108 and 113.

*Primary Examiner*—Robert B. Reeves
*Assistant Examiner*—Dennis H. Pedder
*Attorney, Agent, or Firm*—Werner W. Kleeman

[57] ABSTRACT

The collision protection device comprises a collision protector held in a rest position by spring force. Upon collision against an obstacle, the collision protector is displaced against the spring force and thus cooperates with a de-energizing device. This collision protector is mounted on the vehicle chassis by two swing arms arranged symmetrically non-parallel or in angled relationship to the longitudinal axis of the vehicle. This is to permit the de-energizing device to function effectively, irrespective of the place of impact of the obstacle against the collision protector and irrespective of any deformation of the collision protector. Each swing arm is pivotably mounted on the collision protector and on a sliding link member. Each sliding link member is acted upon by the spring force and is displaceably positioned on a cross-shaft mounted on the vehicle chassis perpendicular to the longitudinal axis of the vehicle. Each sliding link member cooperates with the de-energizing device by means of a switching cam or ramp surface when displaced against the spring force. Two flexible retaining elements which may comprise cables or bands connect the collision protector with the vehicle chassis. These cables or bands are arranged at or adjacent the sides of the vehicle and symmetrically to the longitudinal axis of such vehicle.

6 Claims, 4 Drawing Figures

COLLISION PROTECTION DEVICE FOR INDUSTRIAL VEHICLES, ESPECIALLY INDUSTRIAL TRUCKS

BACKGROUND OF THE INVENTION

The present invention broadly relates to industrial vehicles and, more specifically, pertains to a new and improved construction of a collision protection device for industrial vehicles.

Generally speaking, the present invention relates to a collision protection device for industrial vehicles, wherein a moveable or displaceable collision protector or bumper which extends at least over the whole or overall width of the vehicle and which is retained in a rest position by means of spring force cooperates with a de-energizing device. The de-energizing device triggers a vehicle stopping operation when the collision protector collides against an obstacle and is consequently moved against the spring force. The collision protector initially effects a short actuation movement or throw displacement of sliding link members when, in turn, cause actuation of the de-energizing device. While the vehicle is being retarded or decelerated, the collision protector subsequently implements a longer throw displacement of these sliding link members during which time it is ensured that the de-energizing device still remains activated.

In other words, the collision protection device of the present invention is for protecting industrial vehicles, especially industrial trucks such as fork-lift trucks, warehouse transport trucks and storage system robots, against collision with an obstacle or another vehicle. The collision protection device comprises a displaceable collision protector or bumper having a rest position and a de-energizing device or switch means cooperating with the displaceable collision protector or bumper. The industrial vehicle has an overall width and the displaceable collision protector or bumper extends at least over the overall width of the industrial vehicle. The collision protection device comprises at least one spring means for generating a biasing force and means enabling the biasing force to retain the displaceable collision protector in the rest position. The de-energizing device has means for causing the industrial vehicle to stop when the displaceable collision protector is moved against the biasing force by collision with the obstacle. The collision protection device has means enabling the displaceable collision protector to effect an initial actuating movement of the de-energizing device and, while the industrial vehicle is being subsequently retarded, implementing a continuation of such actuating movement during which the de-energizing device remains activated.

Such collision protection devices prevent, to a large extent, damage when the vehicle collides against an obstacle, be this a fixed obstacle or a moving obstacle. Collision protection devices must consequently ensure faultless operation, especially so because they are an integral part of automatic, driverless industrial vehicles or robots. For such industrial vehicles, the existence or unexpected appearance of an obstacle is difficult to recognize.

A collision protection device of this general type is mentioned in the German periodical "Automatik" of April 1959, pages 108 and 113. It comprises a collision protector which consists of a rounded-off frame which is fixed on the front of the vehicle by means of a sprung or resilient mount. When the vehicle strikes an obstacle, the collision protector, which is moved against the spring force, activates two microswitches by means of which the vehicle drive is switched off and by which the brakes are activated. By means of the resilient mounting apparatus, the collision protector can move beyond the actuation position of the microswitch in the same manner as the vehicle continues to move due to its inertia after the stop command.

This apparatus which is assembled from a rounded-off, displaceable frame with a support or bracket and which can be steered from the vehicle chassis, can prove to be advantageous if the collision protector collides with an obstacle along the longitudinal axis of the vehicle, and especially if the vehicle possesses only one steerable wheel which is mounted in the middle of the steerable support. The effectiveness of the apparatus becomes questionable as soon as the impact occurs slightly laterally of the collision protector, i.e. eccentrically. This is especially so if the vehicle is equipped with two steerable wheels and if the collision protector is mounted on a fixed component on a vehicle chassis member.

From the German Patent No. 1,781,159, published Apr. 22, 1971 an apparatus is known with which the above-mentioned disadvantages are avoided in that the collision protector comprises a tube arranged as a loop. The tube is constructed out of a flexible or extensible, i.e. elastic material and is filled with a fluid. When any point of the collision protector collides with an obstacle, the pressure change brought about by the deformation of the tube is used to actuate the de-energizing device which triggers a vehicle stop, for instance by means of a membrane.

The main disadvantage of this collision protection device consists in the relative vulnerability of the tube which is constructed of a flexible material. Even in a reinforced embodiment, the tube can be damaged in a collision against an obstacle or can be punctured by sharp objects. Its de-energizing function is then no longer ensured. Furthermore, such a tubular collision protector can only offer protection in a limited vertical range. Moreover, because of its elasticity, it is less suitable for severe impacts than a rigid collision protector.

A further apparatus which is disclosed in the West German Patent Publication No. 1,655,813 and in which the above-mentioned disadvantages are avoided, comprises an elastic collision protector with a ring-like or annular loop whose rounded-off ends are connected with a steerable support or carrier mounted on the front side of the vehicle. Furthermore, the flexible collision protector is connected at two points on its perimeter with the steerable support by means of a de-energizing device which comprises two telescopic, slidable parts. A cam located on one of the two parts actuates a switch mounted on the second part. When the switch is actuated, a vehicle stop is triggered.

The main disadvantage of this apparatus consists in the risk that the collision protector will be deformed beyond its elasticity in a severe collision with an obstacle and/or by the delayed stopping of the vehicle due to its inertia. In this manner, the apparatus could be damaged and the switches could be blocked which would prevent switching the vehicle drive motor on again.

SUMMARY OF THE INVENTION

Therefore, with the foregoing in mind, it is a primary object of the present invention to provide a new and improved construction of a collision protection device for industrial vehicles, especially industrial trucks, which does not exhibit the aforementioned drawbacks and shortcomings of the prior art construction.

Another and more specific object of the present invention aims at providing a new and improved construction of a collision protection device for industrial vehicles of the previously mentioned type whose efficiency or effectiveness is guaranteed, independent of the environment and of the point of impact of the collision protector against an obstacle.

A still further object of the invention is to provide a construction in which the collision protection device functions reliably, independently of any deformation of the collision protector.

Yet a further significant object of the present invention aims at providing a new and improved construction of a collision protection device of the character described which is relatively simple in construction and design, extremely economical to manufacture, highly reliable in operation, not readily subject to breakdown or malfunction and which requires a minimum of maintenance and servicing.

Now in order to implement these and still further objects of the invention, which will become more readily apparent as the description proceeds, the collision protection device of the present invention is manifested by the features it is mounted on the vehicle chassis by means of two swing arms of substantially equal length. The swing arms are substantially symmetrically non-parallel or in angled relationship to the longitudinal axis and are each arranged on a respective side of the longitudinal axis of the vehicle in the rest position of the collision protector. One of the ends of each swing arm is pivotably mounted to the collision protector and the other end is pivotably connected to a sliding bush or sliding link member. The sliding link members are acted upon by a spring force and are displaceable along a cross-shaft which is mounted on the vehicle chassis substantially perpendicular to the longitudinal axis of the vehicle. A switching cam is provided for each sliding link member by means of which each sliding link member cooperates with the de-energizing apparatus when displaced against the spring force. The collision protection device itself is directly connected to the vehicle chassis by means of two flexible retaining elements which are arranged symmetrically, one on each side of the longitudinal axis of the vehicle.

In other words, the collision protection device of the present invention is manifested by the features that it comprises two swing arms of substantially equal length each having ends for mounting the displaceable collision protector on the vehicle chassis, the two swing arms being substantially symmetrically non-parallel in the rest position of the displaceable collision protector. Each swing arm of the two arms is arranged on a respective side of the longitudinal vehicle axis. A first end of each swing arm is pivotably mounted on the displaceable collision protector. The collision protection device comprises two sliding link members, and a second end of each swing arm is pivotably mounted on a respective link member of the two sliding link members. The industrial vehicle comprises a cross-shaft mounted on the vehicle chassis substantially perpendicular to the longitudinal axis. The at least one spring means or springs and the two sliding link members are mounted on the cross-shaft. The two sliding link members are subject to the influence of the biasing force and are displaceable on the cross-shaft. The collision protection device comprises a switching cam for each sliding link member for enabling the two sliding link members to cooperate with the de-energizing device when the two sliding link members are displaced against the biasing force. The collision protection device comprises two flexible retaining elements of substantially equal length symmetrically arranged on respective sides of the longitudinal axis, and the displaceable collision protector is connected directly with the vehicle chassis by the two flexible retaining elements.

An advantage arising from the collision protection device according to the invention consists in that the actuation of the de-energizing device is implemented by the movement of rigid elements connected by pivot joints. The elements form a simply constructed compact folding unit and ensure a high operational reliability. A further advantage of the device according to the invention consists in that it operates with sliding link members which maintain the de-energizing device in an actuated condition over their full displacement, while their maximum displacement is determined by the movement of pivotable arms which are swivably or pivotably connected with the collision protector. Through the choice of the length of the swing arms in correlation with the vehicle characteristics and considering the available displacement path of the sliding link members, it is possible to design a collision protection device in such a manner that during a collision against an obstacle, the possible displacement path of the collision protector is greater than the reaction and stopping distance of the vehicle.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
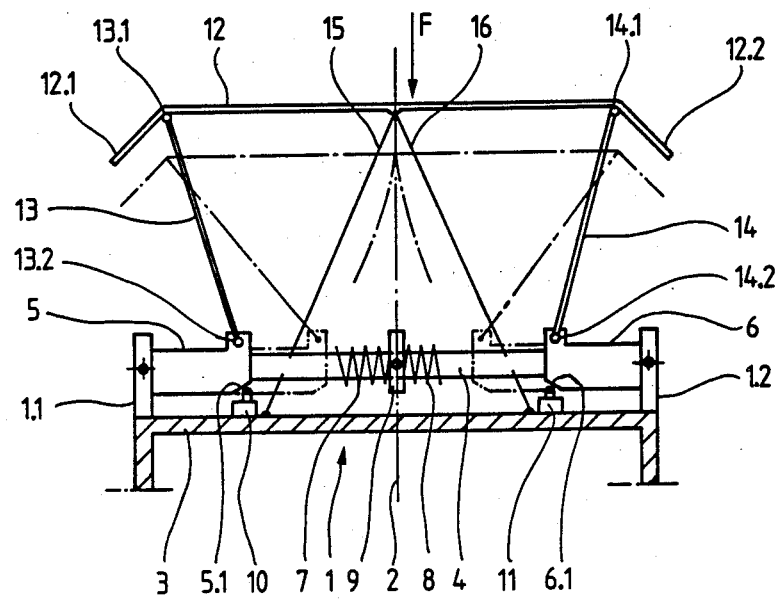
FIGS. 1 and 2 schematically illustrate in plan view a first exemplary embodiment of a collision protection device according to the invention as well as elements of the device in two different operational positions.

Describing now the drawings, it is to be understood that to simplify the showing thereof only enough of the structure of the collision protection device has been illustrated therein as is needed to enable one skilled in the art to readily understand the underlying principles and concepts of this invention. In all the Figures of the drawings only that portion of the vehicle chassis has been shown which concerns the collision protection device. The conventional vehicle drive motor as well as the conventional vehicle brake installation which are controlled by the vehicle collision protection device are not particularly shown in the drawings since details thereof are not important to the understanding of the invention.

Figure 2:
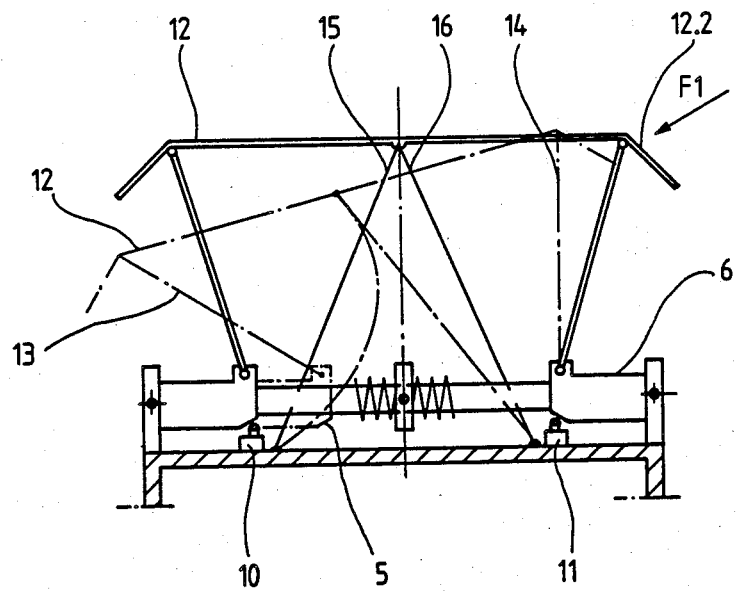

Turning now specifically to FIGS. 1 and 2 of the drawings, the apparatus illustrated therein by way of example and not limitation will be seen to comprise a vehicle chassis 1 of an industrial vehicle. On the vehicle chassis 1, two parallel longitudinal beams or side members 1.1 and 1.2 are mounted at equal distances or spacings from a vehicle longitudinal axis 2. The side members 1.1 and 1.2 are connected with each other by means of a support 3 which extends substantially perpendicular or transversely to the vehicle longitudinal axis 2 and which engages the longitudinal beams or side members 1.1 and 1.2 a short distance from their ends.

The ends of a transverse bar or cross-shaft 4 which may have a rectangular cross-section, are mounted to the ends of the side members 1.1 and 1.2 The transverse bar or cross-shaft 4 may extend substantially parallel to the support 3 and forms a rail or guide on which two sliding bushes or sliding link members 5 and 6 or equivalent structure are mounted. Two compression springs 7 and 8 are located on the transverse bar or cross-shaft 4 and each compression spring 7 and 8 is located on a side of a divider 9 which is mounted on the transverse bar or cross-shaft 4. The two compression springs 7 and 8 each exert an axial pressure on a respective one of the link members 5 and 6. By means of this axial pressure, the corresponding sliding link member 5 or 6 is brought into contact with a related stop member constituted by a related one of the longitudinal beams 1.1 or 1.2.

Each sliding link member 5 and 6 features a bevel or ramp surface 5.1 and 6.1, respectively, on the side facing the rear of the vehicle. The bevels or ramp surfaces 5.1 and 6.1 each form a switching or change-over cam conjointly with the respective sliding link members 5 and 6. By means of one or the other of these bevels or ramp surfaces 5.1 and 6.1, a corresponding switch 10 or 11 is actuated and remains actuated during the whole displacement of the sliding link member 5 or 6 when the sliding link member 5 or 6 is displaced against the force generated by the respective spring 7 or 8.

Each switch 10 and 11 is constructed as a microswitch. The two microswitches 10 and 11 which form the shutoff switch or de-energizing device of the collision protection device can be connected in series in, e.g., a control circuit of the vehicle drive motor and possibly in a control circuit of the braking apparatus.

The reference number 12 designates a rigid, straight metal collision protector or bumper whose ends 12.1 and 12.2 are slightly bent back. The collision protector 12, whose length is equal to or greater than the overall width of the vehicle, is maintained substantially parallel to the support 3 in the rest position.

The reference numbers 13 and 14 designate two substantially equal length swing or pivot arms by means of which the collision protector 12 is maintained in the rest position. They are arranged symmetrically non-parallel or at an angle to the longitudinal which axis 2, one mounted on each side such the longitudinal axis 2 of the vehicle so that they form an open angle facing the front of the vehicle. One of the ends 13.1 and 14.1 of each swing arm 13 and 14 is pivotably connected with the collision protector 12. Another end 13.2 and 14.2 is pivotably connected with a respective one of the sliding link members 5 and 6. Moreover, the collision protector 12 is connected with the vehicle chassis 1 by means of two flexible retaining elements 15 and 16 which may comprise steel cables. The retaining elements 15 and 16 are arranged to be symmetrically non-parallel or at an angle to the longitudinal axis 2, one mounted on each side of the longitudinal axis 2 of the vehicle. One of the ends of each retaining element 15 and 16 is fixed at a common mounting point which is located at the middle of the collision protector 12 while another end of each retaining element 15 and 16 is fixed on the support 3 of the vehicle chassis 1. The retaining elements 15 and 16 are pre-loaded such that they do not influence the function of the compression springs 7 and 8 which cooperate with the sliding link members 5 and 6, respectively.

FIG. 1 shows that under the influence of a symmetrical force F acting on the collision protector 12 in the direction of the longitudinal axis 2 of the vehicle, i.e. in a frontal collision with an obstacle, the jointed unit comprising the collision protector 12, the two swing arms 13 and 14 and the sliding link members 5 and 6 folds or collapses in the manner shown in chain-dotted lines in FIG. 1. The two retaining elements 15 and 16 relax and the two microswitches are simultaneously actuated by the bevels or ramp surfaces 5.1 and 6.1 of the corresponding sliding link members 5 and 6, each of which is displaced against the force of the respective spring 7 or 8 cooperating with it.

FIG. 2, in which only the most important components are presented, shows that when a force F1 acts asymmetrically on the collision protector 12, for example when one end 12.2 of the collision protector 12 collides against an obstacle, that swing arm located nearer the point of impact, for instance the swing arm 14, pivots on its joint or hinge on the corresponding sliding link member 6. Because the collision protector 12 is also connected in the middle with the vehicle chassis 1 by means of the steel cable or retaining element 16, the collision protector 12 pivots about the swing arm end 14.1 of the swing arm 14 so that it comes to lie in the angled position shown in chain-dotted lines. The second sliding link member 5 is consequently displaced against the force of the spring 7. Simultaneously, the corresponding microswitch 10 is actuated and the retaining element 15 relaxes.

It will be seen from both FIGS. 1 and 2 that, independent of the point of impact of an obstacle with the collision protector 12, at least one of the two microswitches 10 and 11 is actuated by the corresponding sliding link member 5 or 6 and the microswitch 10 or 11 remains actuated during the whole displacement of the collision protector 12. FIGS. 1 and 2 also show that by altering the length of the swing arms 13 and 14 to the order of magnitude of the vehicle width, the available displacement path of the collision protector 12 can be increased without altering the shape and dimensions of the same.

Figure 3:
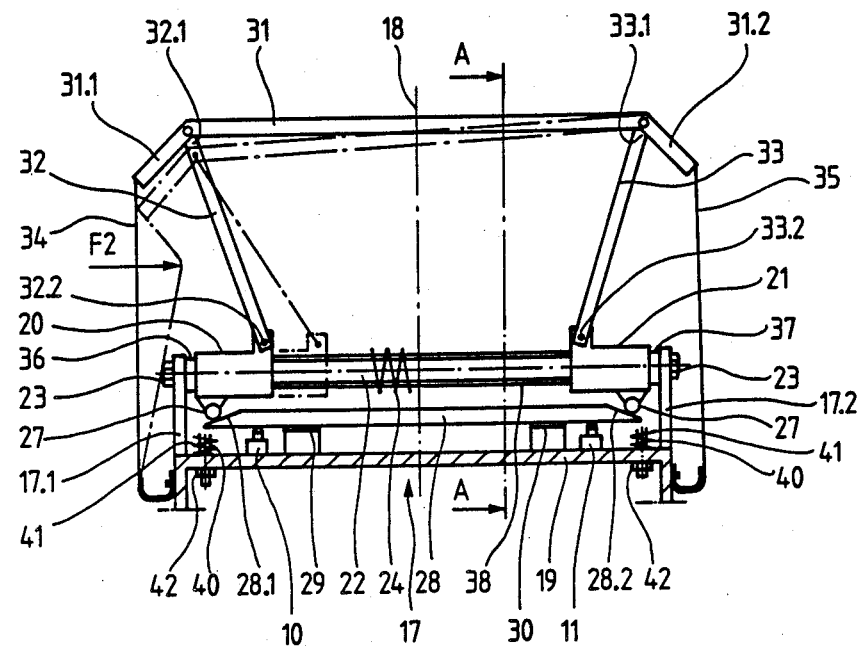
FIG. 3 schematically illustrates in plan view a second exemplary embodiment of the collision protection device according to the invention.
Figure 4:
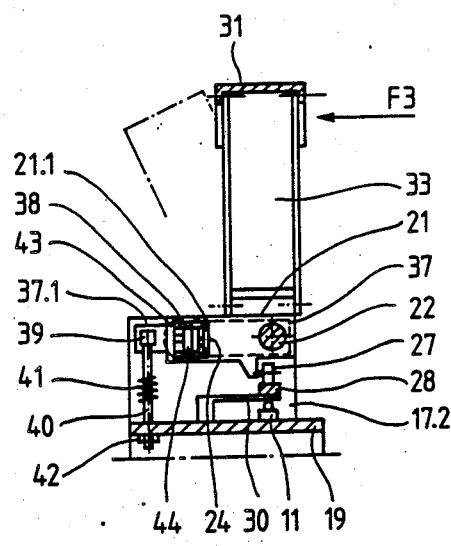
FIG. 4 schematically illustrates a section taken along the line A—A of FIG. 3.

FIGS. 3 and 4 show a preferred embodiment of the invention. In these FIGS. 3 and 4 reference numeral 17 designates a vehicle chassis of an industrial vehicle. As in the preceding embodiments, two parallel side members 17.1 and 17.2 are arranged or located at equal distances from a longitudinal axis 18 of the vehicle. The side members 17.1 and 17.2 are interconnected by a support 19. The reference numbers 20 and 21 designate two sliding bushes or sliding link members which are displaceably and rotatably mounted on a cross-shaft or transverse bar 22 which may have a substantially cylindrical cross-section and is provided with screw threads at its ends. The ends of the cross-shaft 22 are embedded in the ends of the corresponding side member 17.1 and 17.2 and are secured by means of a lock nut 23 or the like. As in the preceding embodiment, the sliding link members 20 and 21 are forced in the direction of their corresponding side member 17.1 and 17.2 by a spring force. In this embodiment, however, the spring force is supplied by only one compression spring 24 whose arrangement will be described later.

As opposed to the inventive embodiment illustrated in FIGS. 1 and 2, the two microswitches 10 and 11, which are also attached to the support 19, are not directly actuated by the sliding link members 20 and 21. Instead of a bevel or ramp surface, both sliding link members 20 and 21 each possess an actuation wheel or roller 27 which, when displaced, presses on a switch actuation element, such as a change-over or switching cam 28. The change-over cam 28 is located between the microswitches 10 and 11 and the sliding link members 20 and 21. The change-over cam 28 is common to both the sliding link members 20 and 21. For this purpose, the change-over cam 28 features bevels or ramp surfaces 28.1 and 28.2 at each end and is elastically mounted on the support 19 by means of the leaf springs 29 and 30. A rigid metal collision protector or bumper 31 is supported by means of two equally long swing arms 32 and 33. The swing arms 32 and 33 are symmetrically non-parallel or form an angle with the longitudinal vehicle axis 18, one located on each side of the longitudinal axis 18 of the vehicle. The ends 32.1, 32.2, 33.1 and 33.2 of the swing arms 32 and 33 are pivotably connected with the collision protector 31 and, respectively, with the corresponding sliding link members 20 and 21. Furthermore, the ends 31.1 and 31.2 of the collision protector are connected with the side members 17.1 and 17.2, respectively, of the vehicle chassis 17 by means of two bands or straps 34 and 35 comprising for instance a synthetic material. The bands 34 and 35 are mounted on the sides of the vehicle and these bands 34 and 35 both form flexible retaining elements.

When the collision protector or FIG. 3 collides against an obstacle, the collision protection device functions in the same manner as illustrated in FIGS. 1 and 2 in which, respectively, a frontal collision and a collision at one of the collision protector ends are illustrated. A substantial additional advantage of the embodiment illustrated in FIGS. 3 and 4 consists in that when a force F2 is exerted on a side of the vehicle and on one or the other of the flexible bands 34 and 35, a corresponding displacement of the collision protector 31 takes place and the microswitches 10 and 11 are thereby actuated. This type of possible collision is indicated in FIG. 3 in chain-dotted lines. The collision protector 31 and its two correspondingly arranged bands 34 and 35 ensure effective protection against frontal as well as side collisions.

Respective swivel levers or arms 36 and 37 are placed between each sliding link members 20 and 21 and the corresponding side member 17.1 and 17.2. The two swivel levers or arms 36 and 37 are positioned on the substantially cylindrical cross-shaft 22 of the sliding links or sliding link members 20 and 21. The two swivel arms 36 and 37 are connected with each other in their respective lower portions by a channel or U-shaped member 38. The flanges of the channel 38 are downwardly oriented (to the left in FIG. 4) and are embedded in corresponding rectangular grooves 20.1 and 21.1 provided on the lower part of each sliding link member 20 and 21. A compression spring 24 is arranged on the channel 38 between the two sliding link members 20 and 21. The compression spring 24, as mentioned above, generates the spring forces by means of which the two sliding link members 20 and 21 are forced in the direction of their corresponding side member 17.1 and 17.2. The two swivel levers or arms 36 and 37 are each provided with a bolt 39 at their lower ends 36.1 and 37.1. A rod 40 is fixed on each bolt 39 and 40. The rod 40 has a threaded end which freely passes through a corresponding bore in the support 19. On each rod 40, a compression spring 41 is mounted between the support 19 and the bolt 39. By means of a nut 42 provided on the end of rod 40, the spring force can be so adjusted that the swivel levers or arms 36 and 37 together with the two sliding link members 20 and 21 take up a substantially vertical rest position. The vertical rest position corresponds to the horizontal position of the swing arms 32 and 33 which connect the sliding link members 20 and 21 with the collision protector 31. In order to improve the relative displacement between each sliding link member 20 and 21 and the channel 38, a washer or plate 43, which is positioned on the lower or bottom end of each sliding link member 20 and 21, is provided with a roller 44. The roller 44 lies or is positioned between the flanges of the channel 38.

Due to this arrangement, which allows the device to swivel downwards against the force created by the compression spring 41, damage to the device can be avoided when the collision protector 31 is acted upon by a vertical force F3 which, e.g., can be brought about by a vehicle load or cargo or also by a person.

From FIGS. 3 and 4, it can be seen that by suitably selecting the axial position of the actuation roller 27 which is mounted on each sliding link member 20 and 21 relative to the axes 22 of the sliding link members 20 and 21 and to the position of the ends 28.1 and 28.2 of the change-over or switching cam 28, the swivelling movement of the sliding link members 20 and 21 can also be used to actuate the microswitches 10 and 11. In this manner, when a vertical force acts upon the collision protector 31, an automatic vehicle stop is triggered.

It is obvious that several variants of the above-described embodiments can be used or employed within the teachings of the invention, e.g., the two swing arms 13 and 14 or 32 and 33 can be so arranged that instead of conjointly forming an open angle towards the front of the vehicle, they form an open angle to the rear of the vehicle which results in a reversal of direction of the displacement of the sliding link members 5 and 6 or 20 and 21. Likewise, in the embodiment according to FIGS. 1 and 2, the separately provided compression springs 7 and 8 could be replaced by a compression spring common to the two sliding link members 5 and 6. In the embodiment according to FIG. 3 and 4 it would be also possible to equip the de-energizing device with only one switch which is actuated by the change-over or switching cam 28. Also, instead of the change-over cam 28, it would be possible to assign two separate change-over cams, each to a respective link member 20 and 21 and to a respective switch 10 and 11.

While there are shown and described present preferred embodiments of the invention, it is to be distinctly understood that the invention is not limited thereto, but may be otherwise variously embodied and practiced within the scope of the following claims.

Accordingly, what we claim is:

1. A collision protection device for protecting an industrial vehicle having a vehicle chassis, an overall width and a longitudinal axis against collision with an obstacle, comprising:

a displaceable collision protector having a rest position;

a de-energizing means cooperating with said displaceable collision protector;

said displaceable collision protector extending at least over said overall width of said industrial vehicle;

at least one spring means for generating a biasing force;

means enabling said biasing force to retain said moveable collision protector in said rest position;

said de-energizing means being adapted for causing said industrial vehicle to stop when said displaceable collision protector is moved against said biasing force by collision with said obstacle;

said enabling means including two swing arms of substantially equal length and each having two ends for mounting said displaceable collision protector on said vehicle chassis;

said two swing arms being substantially symmetrically non-parallel to said longitudinal axis in said rest position of said displaceable collision protector;

each swing arm of said two swing arms being arranged on a respective side of said longitudinal axis;

a first end of each said swing arm being pivotably mounted on said displaceable collision protector;

said enabling means further including two sliding link members;

a second end of each said swing arm being pivotably mounted on a respective sliding link member of said two sliding link members;

a cross-shaft mounted on said vehicle chassis substantially perpendicular to said longitudinal axis;

said at least one spring means and said two sliding link members being mounted on said cross-shaft;

said two sliding link members being subject to the influence of said biasing force and being displaceable on said cross-shaft;

at least one switching cam for said sliding link members for enabling said two sliding link members to cooperate with said de-energizing means when said two sliding link members are displaced against said biasing force;

two flexible retaining elements of substantially equal length symmetrically arranged on respective sides of said longitudinal axis; and said displaceable collision protector being connected directly with said vehicle chassis by said two flexible retaining elements.

2. The collision protection device as defined in claim 1, wherein:

said de-energizing means comprises two switches which are mounted on said vehicle chassis along a displacement path of said two sliding link members;

each switch of said two switches being associated with a respective sliding link member of said two sliding link members;

each said respective sliding link member having a bevel for forming said at least one switching cam integrally with said sliding link member; and said two switches being positioned for actuation by said bevels.

3. The collision protection device as defined in claim 1, further including:

means for resiliently mounting said at least one switching cam on said vehicle chassis and said at least one switching cam being arranged between said two sliding link members and said de-energizing means.

4. The collision protection device as defined in claim 1, wherein:

said two flexible retaining elements comprise bands which are arranged on respective sides of said industrial vehicle; and a respective first end of each said band being connected with an associated end of said displaceable collision protector; and a respective second end of each said band being mounted to said vehicle chassis.

5. The collision protection device as defined in claim 1, further including:

two further springs for generating a further biasing force; and said two sliding link members being swivably arranged on said cross-shaft and subject to the influence of said further biasing force for maintaining said displaceable collision protector in a raised position in which said swing arms extend substantially horizontally.

6. A collision protection device for protecting an industrial vehicle having a vehicle chassis, an overall width and a longitudinal axis against collision with an obstacle, comprising:

a displaceable collision protector having a rest position;

a de-energizing means cooperating with said displaceable collision protector;

said displaceable collision protector extending at least over said overall width of said industrial vehicle;

at least one spring means for generating a biasing force;

means enabling said biasing force to retain said moveable collision protector in said rest position;

said de-energizing means being adapted for causing said industrial vehicle to stop when said displaceable collision protector is moved against said biasing force by collision with said obstacle;

said enabling means including two swing arms each having a first end and a second end for mounting said displaceable collision protector on said vehicle chassis;

said two swing arms being oriented in mutually non-parallel relationship in said rest position of said displaceable collision protector;

said first end of each said swing arm being pivotably mounted on said displaceable collision protector;

said enabling means further including two sliding link members;

said second end of each said swing arm being pivotably mounted on a respective sliding link member of said two sliding link members;

a cross-shaft mounted on said vehicle chassis for mounting said at least one spring means and said two sliding link members;

said two sliding link members being subject to the influence of said biasing force and being displaceable on said cross-shaft;

switching cam means for said sliding link members for enabling said two sliding link members to cooperate with said de-energizing means when said two sliding link members are displaced against said biasing force;

two flexible retaining elements arranged on respective sides of said longitudinal axis; and said displaceable collision protector being connected directly with said vehicle chassis by said two flexible retaining elements.

* * * * *